March 17, 1931.    W. O'KEEFE    1,796,874
BRAKE EQUALIZER
Filed Nov. 27, 1929    3 Sheets-Sheet 1
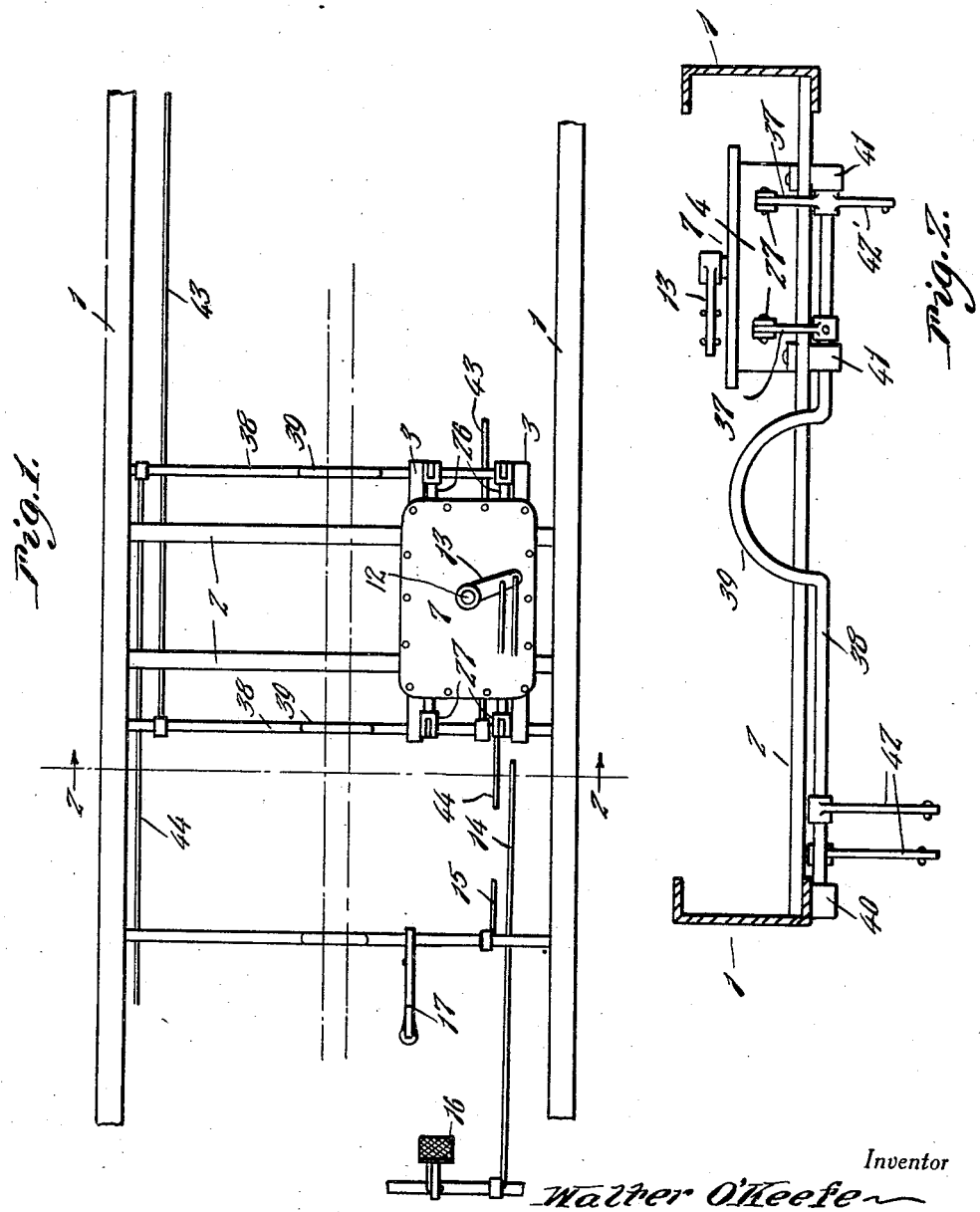
Inventor
Walter O'Keefe
By Clarence A. O'Brien
Attorney

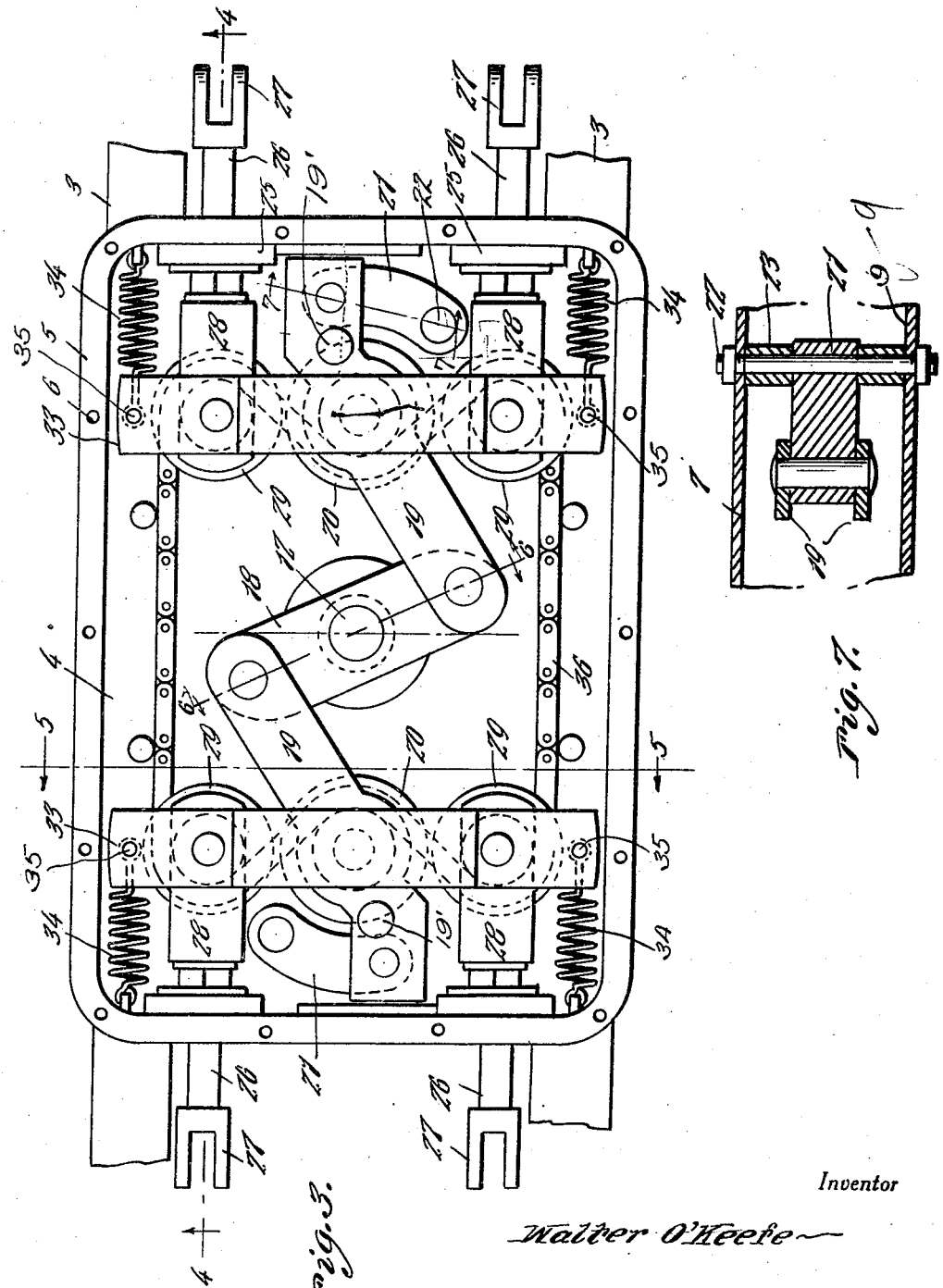

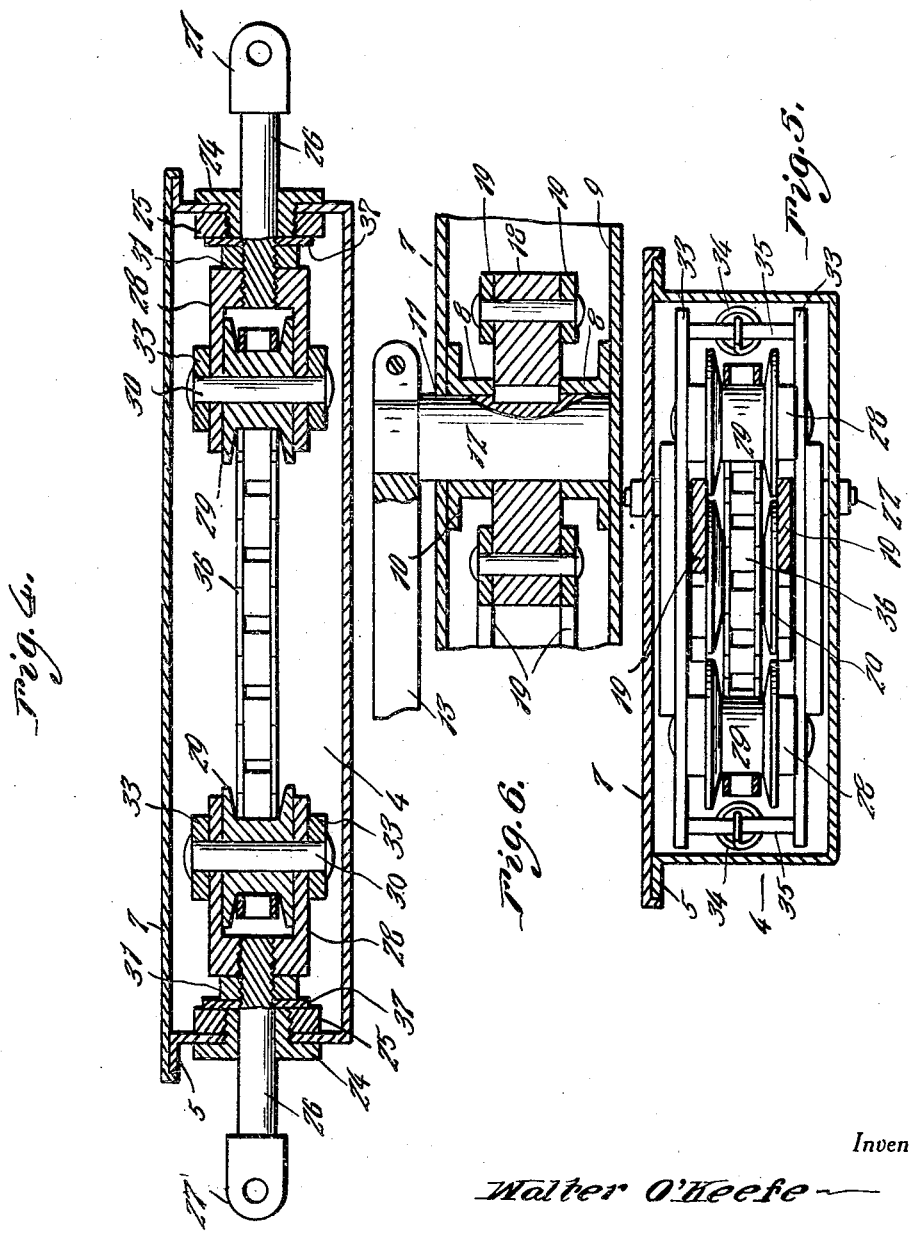

Patented Mar. 17, 1931

1,796,874

UNITED STATES PATENT OFFICE

WALTER O'KEEFE, OF SCHENECTADY, NEW YORK

BRAKE EQUALIZER

Application filed November 27, 1929. Serial No. 410,072.

This invention relates to brake equalizers and more particularly to devices of this character which are adapted for use on automobiles having both front and rear wheel brakes but it is to be understood that an equalizer constructed in accordance with this invention may be used upon any type of vehicle or for any purpose for which the same is found adapted.

An important object of the invention, is to provide, in a manner as hereinafter set forth, a brake equalizer of the aforementioned character which will exert a uniform pull on all four brakes of the vehicle regardless of the condition of the brake band or the adjustment of the brake rods.

Another important feature of the invention resides in the provision of a link and lever actuated endless chain which is trained over a series of pulleys which are, in turn, operatively connected to the front and rear brake rods for the purpose of simultaneously actuating the same.

Other objects of the invention are to provide a brake equalizer of the character set forth which will be simple in construction, strong, durable, efficient in its use and which may be manufactured at low cost.

Other objects and advantages of the invention will become apparent from a study of the following specification, taken in connection with the accompanying drawings wherein like characters of reference designate corresponding parts throughout the several views, and wherein:—

Figure 1 is a top plan view of a brake equalizer constructed in accordance with this invention, the same being shown mounted in position on the chassis of an automobile or truck.

Figure 2 is a transverse sectional view taken through the chassis of the car substantially on the line 2—2 of Figure 1 and looking in the direction of the arrows, the brake equalizer being shown in front elevation mounted thereon.

Figure 3 is a top plan view of the equalizer with the cover plate removed from the casing.

Figure 4 is a longitudinal vertical sectional view taken substantially on the line 4—4 of Figure 3.

Figure 5 is a transverse vertical sectional view taken substantially on the line 5—5 of Figure 3.

Figure 6 is a fragmentary vertical sectional view taken substantially on the line 6—6 of Figure 3.

Figure 7 is a fragmentary sectional view taken substantially on the line 7—7 of Figure 3.

Referring to the drawings in detail, the reference character 1 designates the parallel spaced channel bars of the vehicle chassis between which extends a pair of transverse longitudinally spaced parallel supporting bars 2. Adjacent one end of the supporting bars 2 a pair of spaced longitudinally extending parallel bars 3 are mounted and having their opposite ends extending beyond the respective bars 2. A substantially rectangular casing 4 is fixed on the bars 3 and has its upper edge turned outwardly to provide a flange 5 having threaded openings 6 therein for the reception of securing elements for mounting a cover plate 7 thereon.

A pair of vertically disposed sleeves 8 are fixed to the central portions of the inner faces of the bottom wall 9 of the casing and the cover plate 7 and have their free ends in spaced opposed relation with respect to each other. The sleeves 8 are provided with flanges 10 for fixing the same to their respective supports by any suitable means, such as welding. The cover plate 7 is provided with an opening 11 in alignment with the bores of the sleeves 8. A shaft 12 is mounted for rotation in the sleeves 8 and has its lower end disposed on the bottom wall 9 and its upper end projecting outwardly through the opening 11 of the cover plate 7 and terminating in a reduced end portion for receiving an eye on the end of a horizontally disposed actuating arm 13. The arm 13 at its free end portion, is provided with a pair of openings for the purpose of coupling a foot brake rod 14 and a hand brake cable 15 thereto. The rod 14 is secured to the usual foot pedal 16 and the cable 15 is secured to the hand lever 17.

A toggle mechanism comprising a double ended arm or lever 18 has its intermediate portion fixed on the shaft 12 between the opposed end of the sleeves 8 and pivotally connected to the opposite end of the lever 18 are a pair of links 19, the links of each pair being disposed on the upper and lower sides of the lever 18 and a pair of said links is connected with each end of the lever and normally extends substantially at right angles thereto in opposite direction. As seen in Figure 3 the lever 18 is normally disposed diagonally with respect to the casing and the pairs of links 19 are also disposed diagonally in the casing.

Adjacent their outer ends, the pairs of links have journaled therebetween the grooved pulleys 20 and the outer end portions of said links are disposed longitudinally with respect to the casing and have pivotally connected thereto the pivotally mounted supporting arms 21 (see Figures 3 and 7). The supporting arms 21 are pivotally mounted in the casing in spaced relation with respect to the cover plate 7 and the bottom 9 thereof through the medium of a vertical pivot bolt 22 which is supported in said cover plate and bottom wall and the spacing collars 23 mounted thereon. Lugs 19' are mounted on the links 19 for a purpose which will be more fully hereinafter set forth.

In each end of the casing 4 a pair of openings are provided through which extends the flanged bushings 24 which are secured in place through the medium of the jam nuts 25 which are threaded thereon on the inner side of the casing. Rods 26 slidably extend through the bushings 24 and have their outer end portions provided with apertured bifurcations 27 for a purpose which will be more fully hereinafter set forth. The inner ends of the rods 26 are threaded for engangement with the closed end portions of the substantially U-shaped brackets 28 between the legs of which are journaled the grooved pulleys 29 on the journal pins 30. A jam nut 31 is threaded on each of the rods 26 for engagement with the adjacent faces of the brackets 28 for securing the same against displacement. A washer 37 is disposed on each of the rods 26 for engagement with the inner ends of the bushings 24. The pairs of brackets 28 on each end of the casing 4 are secured together in a manner to move in unison through the medium of the transversely extending metallic straps 33 which extend transversely across the outer faces of the legs of said bracket 28 and are secured thereto through the medium of the journal pin 30 which projects beyond the legs of the bracket, as seen in Figure 4, and have their opposite ends upset for securing the straps in place thereon. As seen most clearly in Figure 3, the pulleys 29 and 20 are transversely aligned and as best seen in Figure 5 said pulleys are in the same horizontal plane. Resilient pull springs 34 are anchored to the opposite end portions of each pair of the straps 33 through the medium of the vertical pins 35 which extend between the end portions of each pair of said straps. The opposite ends of the springs 34 are anchored to the ends of the casing 4. An endless chain 36 is trained around the outer side of the pulleys 29 and over the inner side of the pulley 20 as best illustrated in Figure 3.

The outer ends of the rods 26 are pivotally connected to arms 37 fixed on the rockable shafts 38 which are provided with a bowed intermediate portion 39 for the accommodation of the drive shafts of the vehicle (not shown). The opposite ends of the shafts 38 are journaled in suitable brackets 40 on one of the channel bars 1 of the vehicle and on journaled brackets 41 which depend from the bars 3. The shafts 38 are provided with depending arms 42 and to the free ends of the arms 42 on the front shaft 38 are connected the rearwardly extending brake rods 43 which are connected to the rear brakes and from the free end portions of the arms 41 on the rearmost of the shafts 38 are connected the forwardly extending brake rods 44 which have their opposite ends connected to the front wheel brakes.

When the operator actuates either the foot pedal 16 or the hand lever 17, the arm 13 is swung in a horizontal plane and like movement is imparted to the lever 18 through the medium of the shafts 12. The pulleys 20 are thus drawn inwardly and the chain 36 is caused to travel over the pulleys 29 and the rods 26 will be drawn into the casing 4 against the tension of the coil springs 34 and the shafts 38 will be rocked in a manner to apply the brakes of the vehicle through the rods 43 and 44. When the pedal 16 or the lever 17 is released, the coil spring 34 returns the parts to their normal inoperative position. Should the chain 36 break, the lugs 19' will engage the straps 33 and thus operatively connect the links 19 with the straps for moving said straps toward each other to operate the rods 26 when the lever 18 is actuated.

It is believed that the many advantages of a brake equalizer constructed in accordance with this invention will be readily understood, and although the preferred embodiment of the invention is as illustrated and described, it is to be understood that changes in the details of construction may be had which will fall within the scope of the invention as claimed.

What is claimed is:—

1. A brake equalizer for vehicles of the character described comprising a casing having side and end walls, pairs of horizontally disposed brake actuating rods slidably extending through the end walls and operatively connected to the brakes of the vehicle at their outer ends, pulleys rotatably mounted on the inner ends of the rods, a vertically disposed shaft mounted for rotation in the casing, a double ended lever fixed on the shaft for rotation therewith, links pivotally connected to the opposite end of the lever and extending in opposite direction therefrom, pulleys journaled on the outer end portions of the links in the horizontal plane of the first named pulley, an endless chain trained over the outer sides of the first named pulleys and over the inner sides of the last named pulleys and manually operable means connected with the vertical shaft for shifting the last named pulleys inwardly with respect to the casing for actuating the chain in a manner to draw the first named pulleys and the brake rods inwardly with respect to the casing for actuating the brakes of the vehicle.

2. A brake equalizer for vehicles of the character described comprising a casing having side and end walls, brake actuating rods slidably extending through the end walls of the casing and having their outer ends operatively connected to the brakes of the vehicle, substantially U-shaped brackets mounted on the inner ends of the rods and disposed in the casing, pulleys journaled in the U-shaped brackets, transversely extending coupling straps secured to the brackets at each end of the casing, a vertical shaft mounted for rotation in the casing, a double ended lever fixed on said shaft for rotation therewith, pairs of links pivotally connected to the opposite end portions of the lever and extending in opposite direction therefrom, pulleys journaled between the free end portions of each pair of links in substantially transverse alignment with the first named pulleys and in the horizontal plane thereof, supporting arms shiftably supporting the free ends of the links in the casing, an endless chain trained around the outer sides of the first named pulleys and around the inner sides of the last named pulleys, means for actuating the shaft, double ended lever, links and the pulleys for drawing the chain over the first named pulleys in a manner to shift the same inwardly together with the brake actuating rods and resilient means for returning the first named pulleys and the rods to normal inoperative position.

In testimony whereof I affix my signature.

WALTER O'KEEFE.